United States Patent
Markham

[15] 3,677,316
[45] July 18, 1972

[54] METHOD AND APPARATUS FOR SHARPENING FORAGE HARVESTER KNIVES

[72] Inventor: David Rees Markham, Ottumwa, Iowa
[73] Assignee: Deere & Company, Moline, Ill.
[22] Filed: March 11, 1970
[21] Appl. No.: 18,410

[52] U.S. Cl.............................146/242, 146/117, 146/107, 51/250, 56/250
[51] Int. Cl. .........................................................A01d 75/08
[58] Field of Search.................................146/107, 117–123; 51/250; 56/250

[56] References Cited

UNITED STATES PATENTS

| | | | |
|---|---|---|---|
| 3,479,776 | 11/1969 | Berg | 146/117 X |
| 2,121,965 | 6/1938 | Himebaugh | 51/250 X |
| 2,038,470 | 4/1936 | Barnes | 51/250 X |
| 2,364,160 | 12/1944 | Neal | 51/250 |
| 3,370,628 | 2/1968 | Waldrop | 51/250 X |
| 679,168 | 7/1901 | Hoyt | 51/250 |
| 1,734,713 | 11/1929 | Carlson | 56/250 X |

Primary Examiner—Willie G. Abercrombie
Attorney—Vincent H. Harsha, Harold M. Knoth, William A. Murray and John M. Nolan

[57] ABSTRACT

A forage harvester has an axially horizontal cylinder-type cutterhead with a plurality of elongated angularly spaced and axially extending knives at the cutterhead periphery with parallel cutting edges generating a cylinder as the cutterhead rotates. A knife sharpening device is mounted on the harvester adjacent to the cutterhead and includes a sharpening stone adjustable into engagement with the knives at the cutterhead periphery and reciprocatable along the entire length of the knives parallel to the cutterhead axis. In operation the cutterhead is rotated so that the cutting edges are on the advance side of the knives. However, means are provided for reversing the rotation of the cutterhead while the knives are being sharpened so that the sharpening stone engages the heel portion of each knife before the cutting edge, the outward deflection of the sharpening stone due to the engagement with the knives providing a small degree of heel relief on the knives.

13 Claims, 10 Drawing Figures

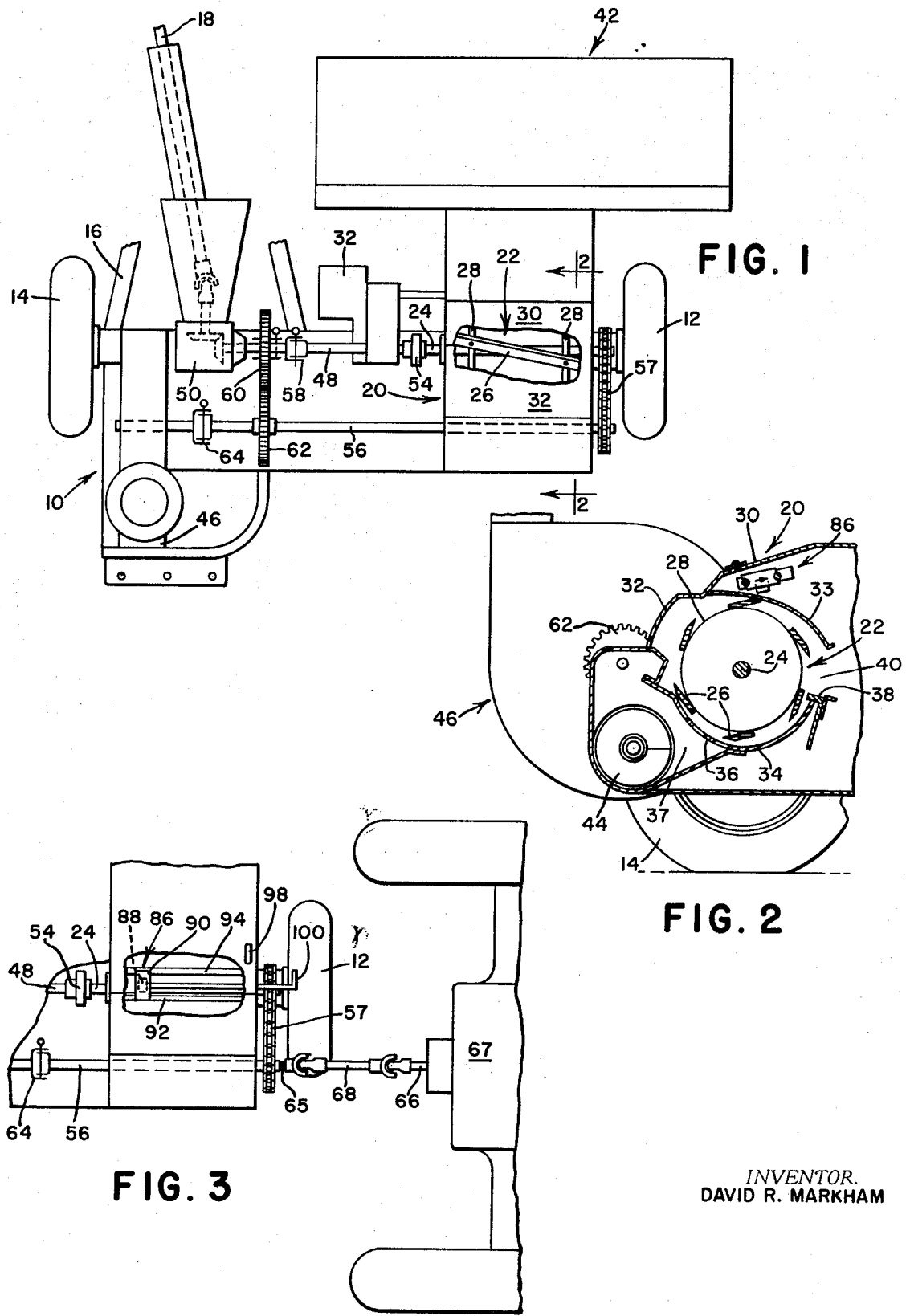

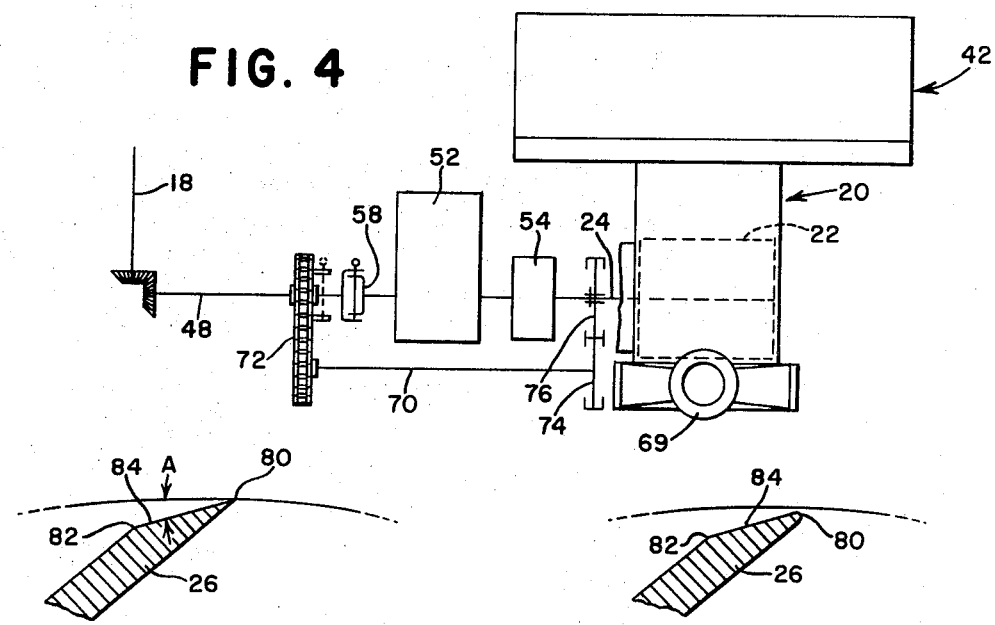
FIG. 4
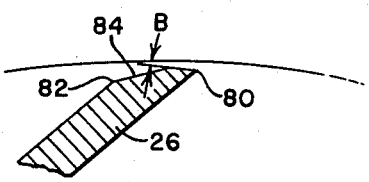
FIG. 5
FIG. 6
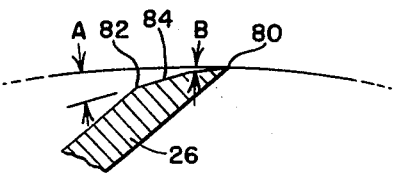
FIG. 7
FIG. 8
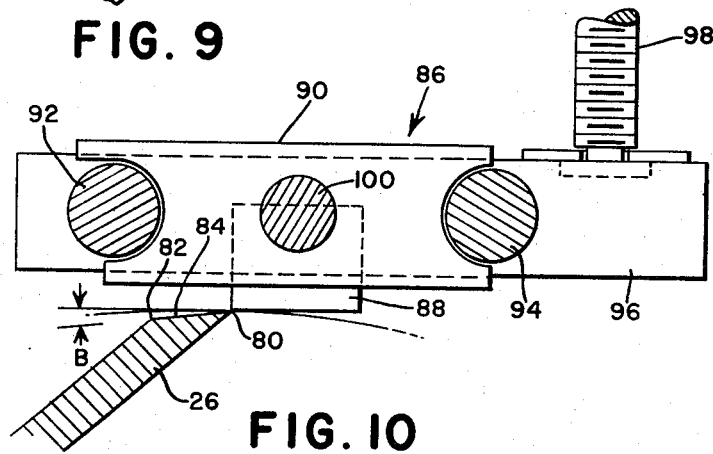
FIG. 9
FIG. 10
INVENTOR.
DAVID R. MARKHAM

METHOD AND APPARATUS FOR SHARPENING FORAGE HARVESTER KNIVES

BACKGROUND OF THE INVENTION

This invention relates to forage harvesters and more particularly to an improved method and means for sharpening the cutterhead knives on a forage harvester.

Most currently manufactured forage harvesters utilize cylinder-type cutterheads, wherein a plurality of elongated angularly spaced knives are mounted on the cutterhead with their cutting edges extending in a generally axial direction at the cutterhead periphery. The crop is fed radially into the cutterhead over a stationary shear bar, which registers with the knife cutting edges. The knives are typically provided with a heel relief, so that the heel or trailing edge of each knife is offset inwardly from the cutting edge, whereby only the cutting edge registers with the shear bar.

During operation of the machine, the knife cutting edges become dull quite rapidly, and, in order to maintain the efficiency of the machine, it is necessary that the knives be sharpened at relatively frequent intervals, sometimes as often as once a day. Thus, it has become common to provide an integral knife sharpening apparatus on the machine capable of sharpening the knives without removing the knives from the cutterhead. Typically the sharpening apparatus comprises a sharpening stone adjustable into engagement with the knives and reciprocatable along the cutterhead periphery parallel to the cutterhead axis, the cutterhead being driven in its normal operating direction while the sharpening stone is reciprocated along the cutterhead periphery, thereby removing material from the knives and restoring a sharp edge on the leading or cutting edge of each knife. Generally, the cutterhead is rotated at a reduced speed during the sharpening operation by reducing the throttle setting of the engine which powers the forage harvester. However, this method of touching up the knives has created a problem, in that the material removed is at the cutterhead periphery at and adjacent to the cutting edge, so that the heel relief on the knife is reduced. After repeated sharpenings, the heel relief disappears. In actual practice, the problem is more acute, since as each knife engages the sharpening stone, the stone deflects outwardly as the knife passes by the stone, so that more material is removed at the leading or cutting edge of each knife than on the heel surface to the rear of the cutting edge. Thus, a negative heel relief is produced on the sharpened surface, so that the cutting edge does not register with the shear bar, but the registry occurs on the heel surface behind the cutting edge. The more numerous the sharpenings, the greater the negative heel relief, so that after numerous sharpenings, there is a substantial negative heel relief, which greatly reduces the efficiency of the harvester.

Thus, heretofore, it has been necessary to periodically remove the knives from the harvester to rebevel or regrind the knives and provide them with their proper heel relief. An alternate method overcoming this problem has been to provide relatively complicated and expensive sharpening devices which will sharpen the knives while still on the cutterhead and while the cutterhead is stationary, such devices conventionally utilizing electric motors to drive a grinding wheel which sharpens the knives at the proper angle.

SUMMARY OF THE INVENTION

According to the present invention, an improved means and method of sharpening the cutterhead knives are provided wherein the sharpened knives are provided with a heel relief without removing the knives from the cutterhead. Specifically, the knives are sharpened by reversing the rotation of the cutterhead during the sharpening operation while using the typical adjustable and reciprocatable sharpening stone at the cutterhead periphery, so that the cutting edge of each knife is on the trailing edge of the knife during the sharpening operation.

An important feature of the invention resides in the provision of simple and inexpensive means for driving the cutterhead in the reverse direction. More specifically, the engine, which normally drives the cutterhead, is also used to drive the cutterhead in a reverse direction, the drive reversal being accomplished by a relatively simple mechanism associated with the normal drive train on the harvester.

BRIEF DESCRIPTION OF THE DRAWINGS

FIG. 1 is a somewhat schematic plan view of a portion of a forage harvester embodying the invention, with portions of the cutterhead housing broken away to show a part of the cutterhead.

FIG. 2 is a side elevation section of the rear portion of the forage harvester as viewed along a line 2—2 of FIG. 1, but on a slightly larger scale.

FIG. 3 is a somewhat schematic plan view of a second embodiment of the invention showing only the cutterhead housing portion of the forage harvester and the rear portion of a tractor operative to drive the cutterhead in a reverse direction, a portion of the cutterhead housing being broken away to show the schematically illustrated sharpening mechanism.

FIG. 4 is a schematic plan view of a third embodiment of the invention in a slightly different type of forage harvester.

FIG. 5 is a schematic section of a cutterhead knife before the knife is used.

FIG. 6 is a view similar to FIG. 5, but showing the knife after its initial use and after it has been somewhat dulled.

FIG. 7 is a view showing the knife in FIG. 6 after it has been sharpened with the prior art method of sharpening the knives on the cutterhead.

FIG. 8 is a view similar to FIG. 7, but showing the knife after repeated sharpenings according to the prior art method.

FIG. 9 is a view similar to FIG. 7, but showing a knife having a relatively small amount of use, and after it has been sharpened according to the present invention.

FIG. 10 is a side section of the knife sharpening apparatus during the sharpening operation according to the present invention, the knife being similar to the knife shown in FIG. 9, but after numerous sharpenings.

DESCRIPTION OF THE PREFERRED EMBODIMENT

The invention is embodied in a forage harvester having a mobile main frame 10 mounted on right and left support wheels 12 and 14 respectively. The harvester is a pull type, PTO operated machine, and accordingly, the main frame includes a fore-and-aft extending draft portion, only the rearward part of which is shown in the drawings and indicated by the numeral 16. As is conventional, the draft portion includes a fore-and-aft extending draft member or tongue connectable to the drawbar of the towing tractor. The overall construction of the forage harvester is substantially similar to that illustrated in U.S. Pat. No. 3,377,785, which is also assigned to the assignee herein. As is also conventional, a fore-and-aft drive shaft 18 extends over the draft member and is connectable at its forward end to the tractor power take-off mechanism via a power shaft which includes a pair of universal joints.

Mounted on the right side of the main frame 10 is a cutterhead housing, indicated in its entirety by the numeral 20. An axially transverse cylinder-type cutterhead 22 is mounted within the housing 20 and includes an axial shaft 24 journaled in and extending through the side walls of the housing and a plurality of elongated, generally axially extending knives 26 mounted on a pair of knife supports 28 carried by the shaft 24. The knives generate a cylinder as the cutterhead rotates and, as best seen in FIG. 1, are of the helical type, the construction of the cutterhead being well known and therefore being only schematically illustrated.

The cutterhead housing 20 includes a top wall 30 having a raisable door 32 adjacent its rearward end. A removable panel 33 is mounted within the housing immediately above and adjacent to the cutterhead periphery and is removable through the door 32 in a well known manner. The lower housing portion or band 34 is disposed immediately below the cutterhead in close proximity to the cutterhead periphery and includes an apertured screen 36 extending across the housing outlet 37. A shear bar 38 spans the width of the cutterhead at the forward end of the lower band 34, the gap between the shear bar and the front end of the removable panel 33 forming an inlet to the cutterhead. As is well known, the shear bar is adjustable and is maintained in registry with the cutterhead knives.

A harvesting header 42, which is schematically illustrated herein, is mounted at the forward end of the cutterhead housing and operates to remove the crop from the field in a well known manner, the particular type of header utilized depending on the crop being harvested. The header moves the crop to feed roll means (not shown), which feed the crop rearwardly through the inlet 40 and over the shear bar 38. As the crop moves past the shear bar, it is reduced by the cutterhead and is impelled through the screen 38 into an auger-type conveyor 44, which moves the crop laterally across the forage harvester and feeds it to a blower-type elevator 46, which impells the crop material upwardly and rearwardly into a collecting vehicle.

The power for the above driven components is supplied through the tractor PTO through a drive train, the drive shaft 18, which is connected to the tractor PTO, serving as the input to the drive train. The drive shaft 18 drives a transverse drive shaft 48 through a conventional gear box 50 at the rear end of the drive shaft 18. The drive shaft 48, in turn, is connected to the cutterhead shaft 24 through a transmission 52 and an over-running one-way clutch 54. The transmission 52 connects the shaft 48 to driving components for the feed rolls and the header 42.

The blower 46 is driven by a transverse shaft 56, which, in turn, is connected to and driven by the cutterhead shaft 24 by means of a chain drive 57 at the right-hand end of the machine. As is apparent, the shaft 56 is parallel to and rearwardly of the drive shaft 48, and the chain drive includes sprockets mounted on the ends of both shafts and connected by a conventional chain, so that the drive shaft 56 is driven in the same direction as the shaft 48 and the cutterhead shaft 24. A separable coupling 58 is provided in the drive shaft 48 between the transmission 52 and the gear box 50, and a spur gear 60 is mounted on the shaft 48 between the coupling 58 and the gear box 50 and is selectively connectable thereto. A second spur gear 62 is attached to the shaft 56 and meshes with the gear 60, and a second separable coupling 64 is provided in the shaft 56 between the gear 62 and the blower 46.

The tractor power off rotates in a clockwise direction, when viewed by a person standing at the rear of the tractor and looking forwardly, so that the drive shaft 18 also rotates in a clockwise direction when viewed from the rear of the forage harvester and looking forwardly (upwardly in FIG. 1). Thus, when the coupling 58 is connected, as shown in FIG. 1, the shaft 48 and the cutterhead shaft 24 connected thereto are driven in a clockwise direction, as viewed from the right hand end of the machine and also as shown in FIG. 2. This, of course, is the normal or forward operating direction of rotation for the cutterhead. When the coupling 58 is connected as shown, the gear 60 is always disconnected from the shaft 48. Preferably, the same removable element or pin is used to alternately couple the gear 60 to the shaft 48 or to connect the coupling 58, so that it is impossible to simultaneously connect the coupling 58 and the gear to the shaft 48. When the gear 60 is connected to the shaft 48 as indicated by the dotted line position of the pin in FIG. 1, the right end of the shaft 48 is disconnected from the left end, which drives the blower drive shaft 56 through the meshing gears 60 and 62 in a counter-clockwise direction as viewed from the right-hand end of the machine. When the shaft 56 is thus reversed, the coupling 64 is preferably disconnected so that the blower 46 is not operated. The reverse or counter-clockwise rotation of the shaft 56 is transmitted to the cutterhead shaft 24 through the chain drive 57, so that the cutterhead is rotated in a reverse direction (counter-clockwise when viewed from the right end of the machine and in FIG. 2.). The over-running one-way clutch 54 prevents the reverse rotation of the cutterhead shaft from being transmitted to the disconnected end of the shaft 48 and the transmission 52. Thus, by simply disconnecting the couplings 58 and 64 and connecting the gear 60 to the shaft 48, the rotation of the cutterhead shaft can be reversed.

An alternate method of reversing the rotation of the cutterhead shaft is shown in FIG. 3, wherein the forage harvester is the same as shown in FIG. 1 except that the separable coupling 58 and the gears 60 and 62 are omitted. Thus, in normal operation when the tractor is connected to the drive shaft 18, the shaft 48 and the cutterhead shaft 24 connected thereto are driven in the normal forward direction. However, a spline connection 65 is provided at the right end of the blower drive shaft 56, so that the shaft can be connected to and driven by the power take-off 66 of a tractor, only the rearward portion of which is shown in FIG. 3 and identified by the numeral 67, the tractor power take-off mechanism 66 being connected to the spline connection 65 through a conventional universal joint-type power shaft 68, which can also be used to connect the front end of the shaft 18 to the power take-off mechanism.

A third embodiment of the invention is shown in FIG. 4, which is a schematic illustration of a forage harvester which is essentially the same as the harvester shown in FIGS. 1 and 3 except that it illustrates a "cut and throw" type machine, wherein the cutterhead 22 also serves to impel the reduced material upwardly and rearwardly through a discharge spout 69, eliminating the cross auger 44 and the blower 46. The cutterhead is again driven in a forward direction by means of a drive shaft 18 connected to the tractor power take-off mechanism, the shaft 18 being connected to the cutterhead shaft 24 through the drive shaft 48, the transmission 52, and the over-running clutch 54. The separable coupling 58 is again connected, as illustrated during normal operation of the machine. For a reverse drive for the cutterhead, a countershaft 70 is provided on the machine parallel to the shaft 48. The countershaft 70 is normally not driven, but when the coupling 58 is disconnected, the shaft 70 is driven in the same direction as the left end of the shaft 48 through a conventional chain drive 72, the input sprocket of which can be selectively coupled to the left-hand or driven portion of the shaft 48 when the coupling 58 is disconnected. The countershaft 70 has a spur gear 74 at its right-hand end, meshing with a spur gear 76, which can be selectively coupled to the cutterhead shaft 24 to drive the cutterhead in the opposite direction from the shaft 70. Thus, to obtain reverse rotation of the cutterhead, the coupling 58 is disconnected, while the chain drive 72 is connected to the shaft 48 and the gear 76 is connected to the shaft 24.

Of course, other mechanisms for reversing the cutterhead drive could be provided within the scope of the invention, the three illustrated drives providing relatively inexpensive and simple means for reversing the drives.

The detailed construction of the outer portions of the knives is shown in FIGS. 5–10 inclusive, which illustrates the knives as viewed from the right end of the cutterhead, the normal or forward direction of rotation of the knives being in a clockwise direction. Each knife has a cutting edge 80 at the outer periphery of the cutterhead and on the leading edge of the knife during normal rotation of the cutterhead. Each knife also has a heel edge 82, trailing the cutting edge 80 adjacent to the outer periphery of the cutterhead and a heel surface 84 extending between the heel edge 82 and the cutting edge 80.

FIG. 5 illustrates the preferred and original configuration of each knife, wherein the heel surface 84 is inclined inwardly away from the periphery of the cutterhead, so that the heel edge 82 is located radially inwardly from the cutting edge 80. When the machine is new, the heel relief or bevel, which is denoted by the angle A in FIG. 5, is preferably approximately 15°. It is well known to provide such a relief on cutting knives, so that only the cutting edge 80 registers with the shear bar 38, thereby increasing the efficiency of the cutterhead. During actual use, the cutting edge 80 is rapidly blunted, as shown in FIG. 6, which represents a cutterhead knife after a relatively short period of use. Obviously, the blunted cutting edge 80 reduces the efficiency of the harvester, and therefore, a sharpening mechanism, illustrated generally by the numeral 86, is conventionally provided on the machine for touching up the cutting edge 80 at relatively frequent intervals.

The construction of such sharpening mechanisms 86 is well known, two typical sharpening mechanisms being shown in U.S. Pat. Nos. 3,331,167 and 3,370,688. The construction of the sharpening mechanism is somewhat schematically illustrated in FIG. 3 and is shown in much greater detail in FIG. 10. The sharpening mechanism includes an abrasive sharpening stone 88 mounted in a carriage 90 which is slidably mounted on a pair of parallel rods 92 and 94 which span the cutterhead housing parallel to and immediately above the cutterhead 22. The rod 92 is fixed, but the rod 94 is supported at its opposite ends on a pair of levers 96 swingable about the axis of the rod 92, whereby the entire assembly is vertically adjustable in an arc about the axis of the rod 92. The vertical adjustment of the assembly is accomplished by rotation of a threaded crank 98, which extends through a threaded opening in the cutterhead housing top wall 30 and is connected to one of the levers 96, whereby rotation of the crank 98 raises or lowers the sharpening mechanism about the axis of the rod 92.

During the operation of the machine, the sharpening mechanism is swung upwardly out of the way of the cutterhead and the removable panel 33 is disposed between the sharpening mechanism and the cutterhead. When the operator decides to sharpen the knives, the panel 33 is removed through the door 32, and the sharpening mechanism is adjusted downwardly until the stone engages the rotating knives. The stone is then reciprocated back and forth across the width of the cutterhead by means of a rod 100, which is attached to the carriage 90 and extends laterally through the side of the cutterhead housing. During normal operation, the cutterhead on the machine such as illustrated in FIGS. 1, 2 and 3, is rotated at approximately 850 rpm, while the preferred grinding speed is approximately 600 rpm. Thus, it is necessary to throttle down the tractor to some extent to obtain the preferred grinding speed during the sharpening operation.

Heretofore, the cutterhead has been rotated in a forward or normal operating direction during the sharpening operation, so that the cutting edge 80 was also on the leading edge of the knife during the sharpening operation. However, when the knives are sharpened in this manner, the sharpened portion of the knife could be expected to have the same radius as the cutterhead, thus reducing some of the heel relief on the knife. In actual practice, it has been found that the sharpened knives have somewhat the configuration of the knife shown in FIG. 7, wherein more material is removed from the leading part of the knife, since, when the cutting edge 80 engages the sharpening stone 88, the force of engagement deflects the sharpening mechanism 86 outwardly due to play in the mechanism or deflects the knife inwardly. Thus, not only is the heel relief lost, but a negative heel relief develops, which has been found to be approximately 3° as indicated by the angle B in FIG. 7. After only a few sharpenings, the knives have the configuration shown in FIG. 7. However, after numerous sharpenings, the entire heel relief is gone as shown in FIG. 8 and there is a substantial negative heel relief or bevel B, whereby only the heel 82 of the knife can be brought into registry with the shear bar, the cutting edge 80 being spaced inwardly from the shear bar. This, of course, drastically reduces the efficiency of the cutterhead and increases the power consumed by the machine. The problem heretofore has been alleviated only by removing the knives from the machine and restoring the bevel, or by utilizing a relatively complex and expensive sharpening mechanism to sharpen the knives while on the machine.

When the knives are sharpened according to the present invention, wherein the direction of rotation of the cutterhead is reversed during the sharpening operation, the inherent negative heel relief or bevel is reversed to again provide a positive heel relief or bevel. Thus, if, after initial wear, the knives were sharpened when the cutterhead was driven in reverse, the stone 88 would initially engage the knife somewhere along the heel surface 84, and the subsequent deflection of the stone would provide a positive heel relief, which has been found to be approximately 3° as again illustrated by the angle B in FIG. 9. The portion of knife not engaged by the sharpening mechanism would retain its approximately 15° heel relief as indicated by the angle A. After numerous sharpenings, the original heel relief would entirely disappear, and the 3° heel relief would extend across the entire heel surface 84, as shown in FIG. 10. Although the larger heel relief indicated by the angle A is desirable, it has been found that the lesser heel relief, indicated by the angle B, as provided by sharpening the knives in the above manner, is satisfactory. Thus, the present method of sharpening knives, and the reversing mechanism for utilizing said method, provide a simple and inexpensive method for maintaining the proper cutting edge on the forage harvester knives.

I claim:

1. In a forage harvester having a cutterhead housing and an axially horizontal cylinder-type cutterhead journaled in the housing and having a plurality of elongated, angularly spaced knives with parallel cutting edges at the cutterhead periphery, each knife having a heel surface at the cutterhead periphery immediately adjacent to and trailing the cutting edge when the cutterhead is rotated in a forward operating direction, the improvement comprising: a knife sharpening element having a width extending in a circumferential direction relative to the cutterhead that is less than five times the circumferential width of said heel surfaces; means mounting the element for adjustment into firm engagement with the knives when the cutterhead is rotating and for outward resilient yielding, and inward rebounding; and reversible drive means for selectively driving the cutterhead in a forward operating direction or a reverse direction, the sharpening element engaging each knife inwardly of the cutting edge when the cutterhead is driven in reverse so that the intermittent force of engagement with the successive knives causes the sharpening element to yield outwardly as each heel surface moves along the sharpening element so as to grind a heel relief extending from each cutting edge, the sharpening element rebounding inwardly after each knife clears the element.

2. The invention defined in claim 1 wherein the cutterhead includes an axial cutterhead shaft and the drive means includes a first drive shaft driven by the power source in one direction, means for selectively connecting the first drive shaft to the cutterhead shaft to drive the cutterhead in its forward direction; a second drive shaft parallel to the first drive shaft; and means for selectively connecting the second drive shaft to the first drive shaft and the cutterhead shaft to drive the cutterhead in said reverse direction.

3. The invention defined in claim 2 wherein the means connecting the second drive shaft to the first drive shaft comprises a drive mechanism operative to drive the second drive shaft in the opposite direction from the first drive shaft and the means for connecting the second drive shaft to the cutterhead shaft comprise a drive mechanism operative to drive the cutterhead shaft in the same direction as the second drive shaft.

4. The invention defined in claim 2 wherein the forage harvester includes blower means for discharging crop material reduced by the cutterhead and the second drive shaft is drivingly connected to the blower means.

5. The invention defined in claim 2 wherein the means connecting the second drive shaft to the first drive shaft includes an endless flexible element operative to drive the second drive shaft in the same direction as the first drive shaft and the means connecting the second drive shaft to the cutterhead shaft includes gear means operative to drive the cutterhead in the opposite direction from the second drive shaft.

6. The invention defined in claim 5 wherein the drive means includes a tractor having a power take-off mechanism, a drive train connected to the cutterhead and including first and second alternate power input means, and means for alternately connecting the power take-off mechanism to the first or the second power input means to respectively drive the cutterhead in the forward and reverse directions.

7. The method of sharpening the knives of a forage harvester cutterhead wherein the cutterhead is of generally cylindrical structure rotatable in a normal forward direction and having a plurality of uniformly angularly spaced elongated, parallel knives provided respectively with initially sharp cutting edges lying on the cutterhead periphery and operative as leading edges cooperative with a fixed shear bar during normal forward operation, each knife having a heel surface trailing its cutting edge and receding radially and circumferentially inwardly of the cutterhead periphery to a terminal trailing edge, and a knife sharpening element adjustable into engagement with the knives, said method comprising: continuously rotating the cutterhead in a reverse direction at a relatively high speed, and adjusting the sharpening element into firm engagement with the knives while the cutterhead is so rotating reversely so that portions of the respective knives behind the respective dulled cutting edges individually and successively engage the sharpening element respectively prior to element-engagement by the respective dulled edges so as to cause the sharpening element to successively deflect outwardly and rebound inwardly at intervals according to cutterhead speed and angular spacing of the knives so as to provide heel relief extending from the new cutting edges.

8. The invention defined in claim 7 where the cutterhead is driven at a slower rotational speed in said reverse direction than in said normal operating direction.

9. In a pull-type forage harvester adapted to be towed and powered by a tractor having a uni-directional power take-off mechanism, said harvester including a generally fore-and-aft drive shaft connectible to the power take-off mechanism, an axially horizontal transversely oriented cutterhead including an axial shaft and a plurality of parallel elongated knives with cutting edges at the cutterhead periphery generating a cylinder as the cutterhead rotates, and a knife sharpening means including a sharpening element adjustable into engagement with the knives as the cutterhead rotates to remove material from the knives, the improvement comprising: a first transverse drive shaft operatively connected to and driven by the fore-and-aft drive shaft; a first disengageable connecting means for selectively drivingly connecting the first transverse drive shaft to the cutterhead shaft to drive the cutterhead in a normal operating direction with the knife cutting edges at the leading edges of the knives; a second transverse drive shaft generally parallel to the first drive shaft; a second disengageable connecting means for selectively drivingly connecting the second drive shaft to the first drive shaft to drive the second drive shaft in the opposite direction from the first; and means operatively connecting the second drive shaft to the cutterhead so that the cutterhead is driven in the same direction as the second drive shaft so that the cutterhead is driven in a reverse direction when the first connecting means is disengaged to disconnect the first drive shaft from the cutterhead shaft and the second connecting means is engaged to reversely drive the second drive shaft, the sharpening element being engageable with the reversely driven cutterhead to facilitate the sharpening of the knives.

10. The invention defined in claim 9 wherein the means connecting the second drive shaft to the first drive shaft includes an endless flexible element.

11. The invention defined in claim 9 wherein the forage harvester includes blower means for discharging crop material reduced by the cutterhead and the second drive shaft is drivingly connected to the blower means.

12. In a forage harvester having a cutterhead housing and an axially horizontal cylinder-type cutterhead journaled in the housing and having a plurality of elongated, angularly spaced knives with parallel cutting edges at the cutterhead periphery generating a cylinder as the cutterhead rotates, each knife having an outer portion inclined outwardly and in a forward operating direction and including a heel surface immediately adjacent to and trailing the cutting edge and having a substantially greater width than the thickness of the outer portion, the improvement comprising: a knife sharpening element having a length less than one-half the axial length of the cutterhead and a circumferential width extending less than 20° relative to the cutterhead axis; means mounting the sharpening element on the harvester for reciprocation lengthwise of the cutterhead, for adjustment into firm engagement with the knives while the cutterhead is rotating and for resilient outward yielding relative to the knives; and reversible drive means operatively associated with the cutterhead for selectively driving the cutterhead in a forward operating direction or in a reverse direction at a speed above 60 rpm, so that the sharpening element engages the outer portion of each knife before the cutting edge when the element is adjusted into a position wherein it extends inwardly of the cutting edges and the cutterhead is driven in the reverse direction, the force of engagement between each knife and the sharpening element causing the element to yield outwardly as the knife moves along the element and rebounds inwardly when the cutting edge clears the element so that a heel relief is provided extending from each sharpened cutting edge.

13. In a forage harvester having a power source, a cutterhead housing and an axially horizontal cylinder-type cutterhead journaled in the housing and having a cutterhead shaft and a plurality of elongated, angularly spaced knives with parallel cutting edges at the cutterhead periphery generating a cylinder as the cutterhead rotates, each knife having a heel surface immediately adjacent to and trailing the cutting edge when the cutterhead is rotated in a forward operating direction, the improvement comprising: a sharpening element having a length substantially less than the axial length of the cutterhead and a circumferential width extending less than 20° relative to the cutterhead axis; means mounting the sharpening element on the harvester for reciprocation for the axial length of the cutterhead, for adjustment into firm engagement with the knives, and for resilient outward yielding of the sharpening element; and a reversible drive train operatively connecting the power source to the cutterhead shaft and including a first drive shaft driven by the power source in one direction, a second drive shaft parallel to the first drive shaft, means operatively connecting the second drive shaft to the cutterhead shaft, means exclusive of the second drive shaft for selectively connecting the first drive shaft to the cutterhead shaft to drive the cutterhead in its forward direction, and means for selectively connecting the second drive shaft to the first drive shaft to drive the cutterhead in said reverse direction, the sharpening element engaging successive knives inwardly of the cutting edges when it is adjusted into firm engagement with the knives and the cutterhead is rotated in reverse so that the force of engagement causes the element to resiliently yield outwardly as each knife moves along the sharpening element and rebounds inwardly when the knife clears the sharpening element to generate heel relief extending from each cutting edge.

* * * * *